Jan. 9, 1951          W. R. KING          2,537,189

POWER OPERATED TIRE CHANGING DEVICE

Filed May 19, 1945          3 Sheets-Sheet 1

WILLIAM R. KING
INVENTOR

BY Lester B. Clark
    Ray L. Smith

ATTORNEYS.

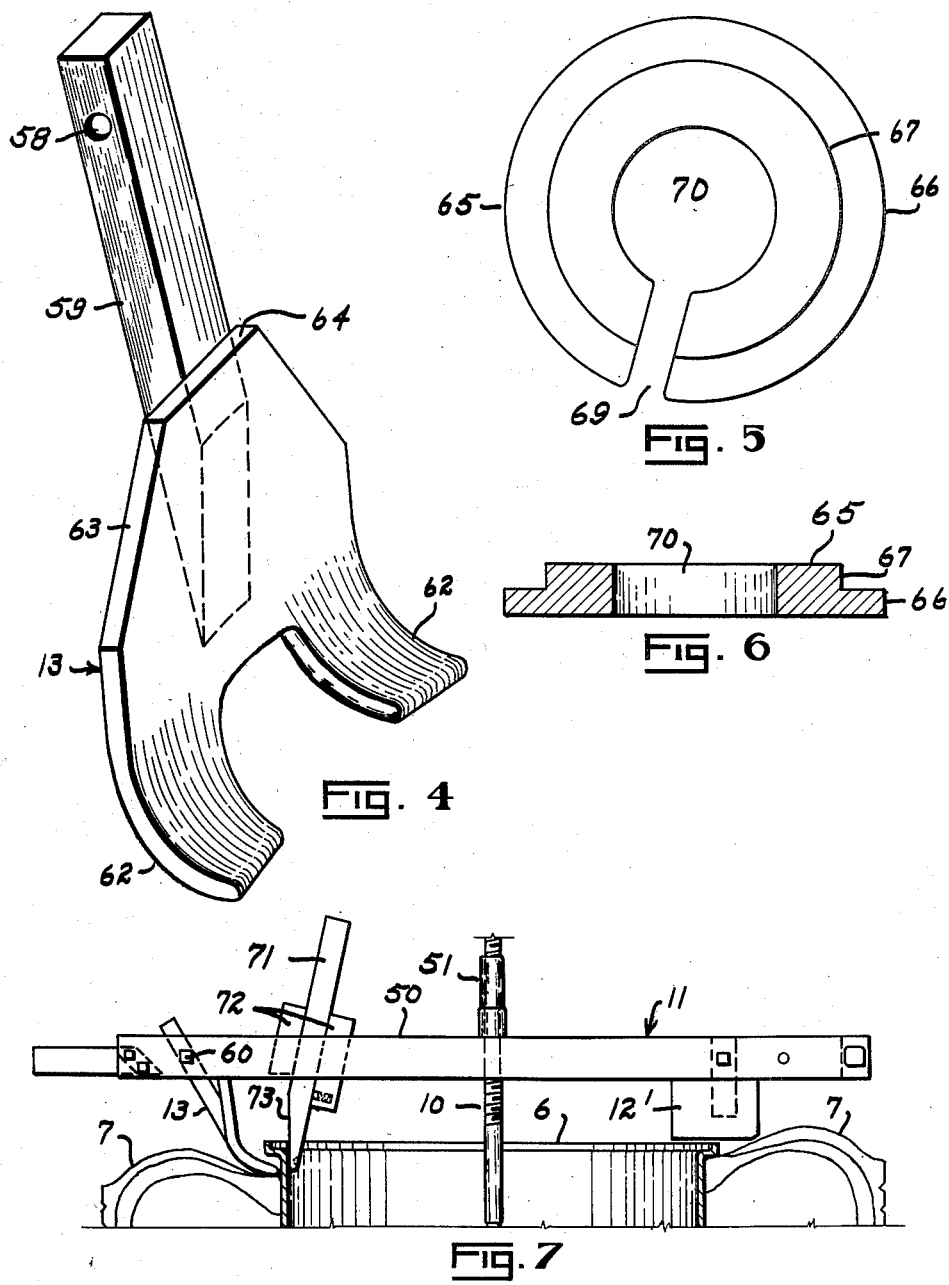

Patented Jan. 9, 1951

2,537,189

UNITED STATES PATENT OFFICE 2,537,189

POWER OPERATED TIRE CHANGING DEVICE

William R. King, Longview, Tex.

Application May 19, 1945, Serial No. 594,715

6 Claims. (Cl. 157—1.17)

This invention relates to improvements in tire changing devices, and more particularly in a device for easily and efficiently applying pressure to move a tire axially upon a wheel or rim from which the tire is to be removed or upon which a tire is to be mounted for use.

It is the primary object of the invention to provide a device of the class described which is simple and inexpensive to construct, and one which may be easily operated and maintained.

Another object is to provide a device which is of particular utility in removing from wheels or rims, tires which are difficult to remove by manual or prior mechanical means.

A still further object is to provide a device which may be operated from the conventional source of compressed air which is available at tire changing stations.

It is also an object to provide a device which is so constructed that the height to which the tire and rim must be lifted, is minimized.

A still further object is to provide a device of the class described which applies pressure to a limited arcuate portion of a tire so that the tire may be moved progressively circumferentially and axially of the wheel or rim.

Still another object is to provide a novel tension assembly in a tire changing device for applying necessary force to move a tire axially of a rim.

The invention also contemplates the provision of a pressure applying assembly which is fulcrumed at one side of the wheel, and which is provided with a pressure foot at the opposite side thereof.

The foregoing objects are the principal objects of the invention and will, together with other objects and advantages, be more fully apparent from a consideration of the following description taken in connection with the accompanying drawings in which:

Fig. 4 is an enlarged view showing the construction of the pressure foot which comprises an element of the pressure assembly;

Fig. 5 is a plan view of a spacer ring used for locating a wheel upon the device;

Fig. 6 is a sectional view through the ring shown in Fig. 5;

Fig. 7 is a view showing an alternate construction of the pressure assembly;

Figure 1:
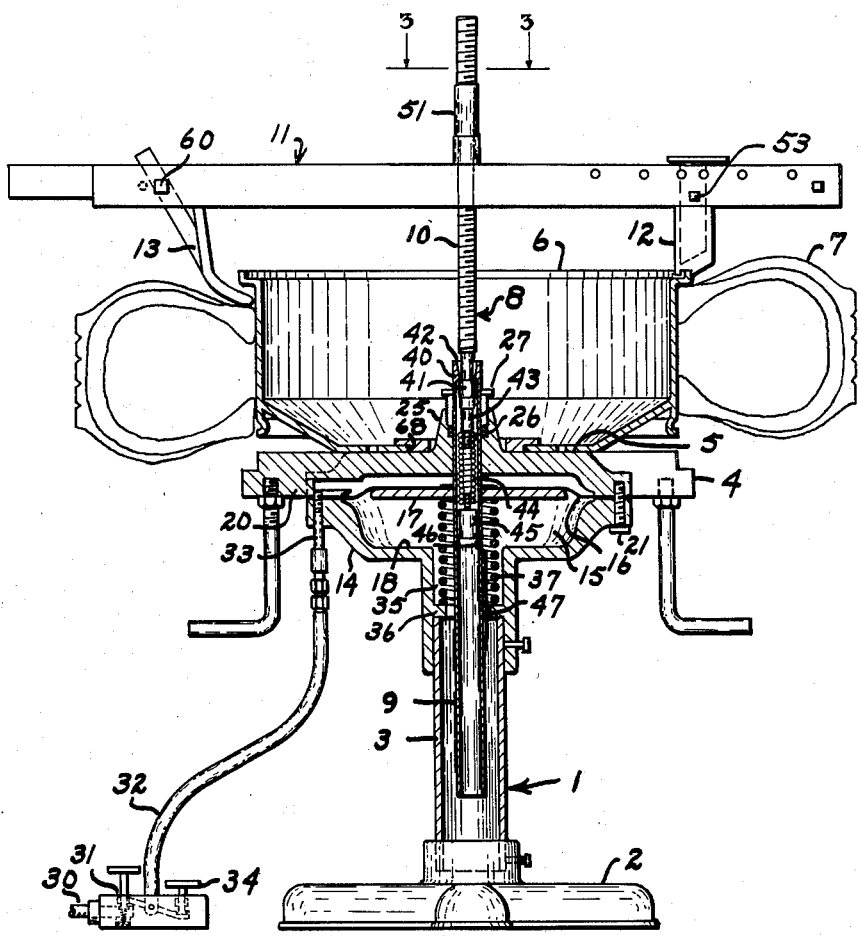
Fig. 1 is an elevational view partly in section of an embodiment of the invention showing a rim and tire in place thereon, the removal of the tire from the rim being in progress.

The disclosed embodiment of the invention comprises a pedestal structure 1 including a foot 2 from which the tubular column extends upwardly and supports the base assembly 4 having upper surface 5 to receive and support a wheel or rim 6 upon which the tire 7 is to be moved. A reciprocable pull or tension assembly 8 extends upwardly from within the base 4 and includes a tubular lower portion 9 into which the rod 10 may be telescoped when the wheel 6 and tire 7 are being positioned upon the device.

When the device is in use the rod 10 is drawn upwardly to the position shown in Fig. 1, and is in engagement with the pressure assembly 11 which extends transversely of the rod, and which carries a stop or fulcrum 12 to engage the rim 6 at one side thereof opposite the pressure foot 13. It is intended that the pressure foot 13 shall engage an arcuate portion of the tire 7 proximate its inner periphery, and hence adjacent the periphery of the wheel or rim 6 so that movement of the foot will effect similar relative movement between the tire and the rim.

The lower portion 14 of the base 4 is cup-shaped and forms a part of the chamber 15 within the base. The interior of this member is smoothly finished and of a configuration to receive the diaphragm 16 and the disk 17 to which the diaphragm is attached. It is apparent that the tubular portion 9 of the tension assembly 8 passes through the disk 17 and is attached thereto so that the tension assembly will be actuated in accordance with movements of the diaphragm and disk as more fully described hereinafter. The bottom 18 of the chamber serves to define the downward limit of travel of the diaphragm assembly.

The upper portion of the base 4 comprises a cap member 20 which is recessed internally to cooperate with the member 14 in forming the chamber 15. The members 14 and 20 are interconnected at their peripheries as by means of cap screws or bolts 21, the periphery of the diaphragm 16 being clamped within the flanged connection between these members.

The cap member 20 has a central hollow boss 25 provided with a counterbore to receive the packing 26 and the gland 27 so as to provide an effective seal about the tubular member 9 of the tension assembly. By means of this construction a pressure fluid, such as compressed air, can be confined within the chamber 15 above the diaphragm 16 and the disk 17 when admitted thereto through the pipe 30, foot operated valve 31, flexible conduit 32, and the pipe 33 which enters the chamber. Such pressure fluid can also be exhausted from the chamber 15 by actuation of the foot valve 34 which is adapted to exhaust the pressure fluid to the atmosphere.

The bottom of the base member 14 has a central bore 35 having a flange 36 intermediate its ends. The column 3 enters the bore below this flange and in this manner the upper portion of the mechanism is supported upon the foot 2. Above the flange 36 there is provided a compression spring 37 which constantly urges the disk 17 upwardly to serve a purpose that will more fully appear in the description of the mode of operation of the device.

It is to be noted that the tubular member 9 of the tension assembly 8 is provided with an internal flange 40 adjacent its upper end and that the downward face of such flange is engageable by the enlargement 41 on the rod 10 which may be telescoped within the member 9. When the rod 10 is extended, however, the flange 40 and the enlargement 41 determine the limit of extension thereof.

The internal surface of the tube 9, upwardly from the flange 40, is tapered at 42 so that the connection is flexible rather than rigid. In order that the rod and tube are normally held in co-axial relation, the rod 10 has an extension 43 which is attached to a closely coiled spring 44 having a plunger 45 at its lower end. It seems apparent that this construction tends to normally hold the rod 10 in a vertical position, but will permit resilient displacement of that rod from its normal position.

Figure 8:
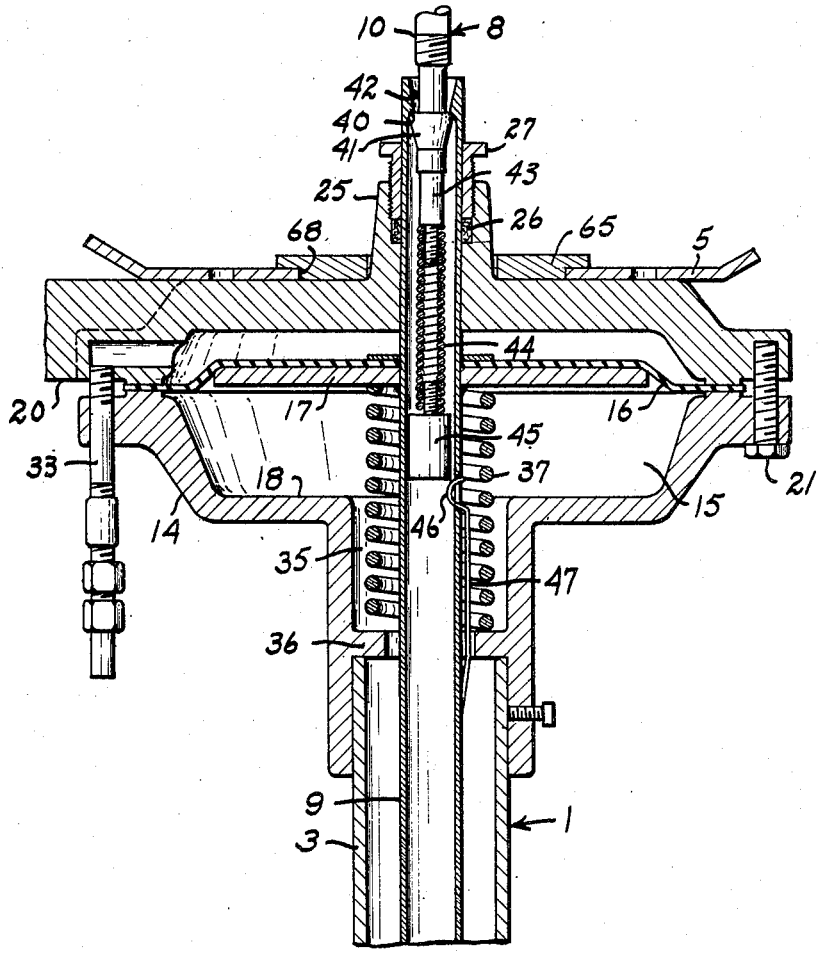
Fig. 8 is a detail of the tension assembly on a somewhat enlarged scale to more clearly illustrate the structure and mode of operation of this assembly.

At the level of the lower end of the plunger 45, as seen in Figure 8 the tube 9 is provided with an opening into which the detent 46 of spring 47 extends. The engagement of this detent with the plunger tends to hold the rod 10 and its associated elements in the position indicated in Fig. 1. However, downward pressure upon the rod 10 will move the detent 46 outwardly whereupon the rod may be telescoped within the tube 9 for the major portion of its length. This telescopic action reduces the over all height of the structure thus far described, and for this reason it is necessary to lift a rim 6 and tire 7 to an elevation only slightly in excess of that of the surface 5 when a tire change is desired.

The transverse portion of the pressure assembly 11 comprises a pair of spaced parallel bars 50 between which the rod 10 extends. The nut 51 upon the rod 10 is of such transverse width that it may readily pass between the bars 50 when desired, and in this manner the pressure assembly may be connected to and disconnected from the rod 10.

Figure 2:
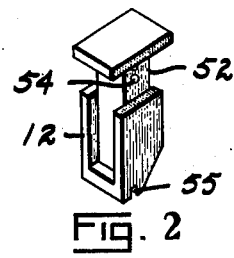
Fig. 2 is a detail of the stop used in one form of the pressure assembly of the device.
Figure 3:
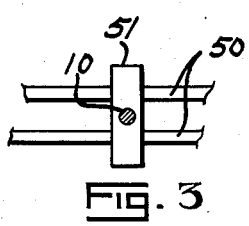
Fig. 3 is a detail plan view taken on line 3—3 in Fig. 1.

The stop 12 may assume various forms, but is intended to be of such construction that it will engage the rim 6 and serve as a fulcrum when the device is in use. As shown in Figs. 1 and 2 this stop has cutaway side portions 52 into which the bars 50 enter and are secured in place as by the bolt 53 passing through opening 54 in the stop. The lower end of the stop or fulcrum 12 has a transverse groove 55 which fits over the end of the rim 6, and in this manner any movement of the assembly 11 transversely of the rim is avoided.

At the side of the rim opposite the stop 12, is provided the pressure foot 13 which is of a particular construction as best seen in Fig. 4. This foot is pivotally mounted between the bars 50 by means of a bolt 60 which passes through the bars and through opening 58 in the shank 59 of the pressure foot. The lower portion of the foot 13 is bifurcated, thus providing toes 62 which extend downwardly and inwardly toward the rim 6 and, as well, arcuately thereabout. Upwardly from the toes 62 the foot is tapered at 63 and terminates in a surface 64 which serves as an abutment for engagement with the lower edges of the bars 50.

It is desirable that the rim 6 and the tire 7 be located upon the surface 5 substantially coaxially of the tension assembly 8. To this end there is provided a stepped ring or disc 65 having peripheral surfaces 66 and 67 of different diameters, it being intended that these diameters shall be such that one or the other will fit closely within the opening 68 (Fig. 1) in the conventional wheel. It is to be understood that other discs of different sizes may be provided and also that it is not imperative that the rim 6 be exactly centered relative to the axis of the device.

In order that such locating ring may be readily applied or removed, a slot 69 extends outwardly from the central bore 70 which is of a diameter to fit closely about the boss 25 upon the base 4.

In describing the operation of the device it will be assumed that the tire 7 is to be removed from a rim 6 although it is to be understood that the device may also be used for the purpose of forcing a tire upon a rim as well as from the rim. The pressure assembly 11 is removed from the device and the rod 10 is pushed downwardly within the tube 9. The tire and rim are then lifted and positioned upon the base 4, the spacer ring 65 being positioned as indicated in Fig. 1 so that the tire and rim are substantially coaxial of the device. The rod 10 is then lifted to the position indicated and the pressure assembly 11 placed thereover so that the stop 12 rests upon one edge of the rim, and the foot 13 opposite thereto has the toes 62 engaging the tire at the juncture of the tire and the rim. The nut 51 is then rotated upon the threads upon the rod 10 until it is closely adjacent the upper surface of the bars 50.

The valve 31 is opened by the application of pressure thereto whereupon the tension assembly 8 moves downwardly to apply desired downward pressure upon the pressure assembly 11. As the bead of the tire 7 moves away from the flanged portion of the rim 6 the toes 62 of the pressure foot 13 move inwardly until they are closely adjacent the periphery of the rim. At such time the abutment 64 on the foot 13 engages the nether surface of the bars 50, and inward movement of the pressure foot is terminated so that continued downward movement of the toes 62 is parallel to the periphery of the rim 6.

When the portion of the tire proximate the foot 13 has moved to the position indicated in Fig. 1, the valve 34 is operated to release pressure fluid from above the diaphragm 16 whereupon the tension assembly moves upwardly. The nut 51 may then be rotated to pass between the bars 50 whereupon the assembly 11 may be lifted and the rim and tire turned to a desired angle so that pressure may be applied to another portion of the tire 7. The operation which is described is repeated at spaced points about the tire 7 so that the tire is moved axially of the rim throughout its periphery. If necessary, as in cases where a tire is extremely tight upon the rim 6, the operation above described may again be carried out throughout the circumference of the tire, and in this manner the tire is forced from the rim.

It is to be noted that, in order to accommodate tires and rims of different sizes, desirably spaced openings may be provided, as indicated, in the bars 50 so that the stop member 12 and the pressure foot 13 may be located as desired.

Fig. 7 of the drawings shows a modified construction of the pressure assembly 11. In this construction the stop 12' has a plane nether surface. In lieu of the groove provided in the stop 12 heretofore described, this embodiment provides a stop bar 71 which is slidably positioned between guides 72 secured to the bars 50. The outer surface of the bar 71 is tapered at 73 so as to lie in a plane parallel with a tangent to the inner surface of the rim 6. It seems apparent that the bar 71 may be moved to a desired position opposite the foot 13 so that movement of the assembly 11 transversely of the rim 6 is avoided thereby.

Broadly the invention comprehends a tire changing device which is simple to construct and operate, and which is capable of readily effecting desired axial movement of the tire relative to a wheel or rim.

What is claimed is:

1. In a tire changing device, a support for a wheel having a tire to be removed therefrom, a pressure assembly including a bar adapted to extend transversely of the wheel, a stop on said bar to engage the rim and form a fulcrum for the assembly, said stop having a recess in the face thereof to engage the rim and restrain the assembly from displacement transversely of the wheel, a pressure foot pivotally attached to said bar to engage the tire opposite said stop, and means for applying a force transversely of the bar whereby the foot displaces a portion of the tire axially of the rim.

2. In a tire changing device, a support for a wheel having a tire to be removed therefrom, a pressure assembly including a bar adapted to extend diametrically of the wheel, a stop arranged to engage the rim at one side thereof, a pressure foot on said bar engageable with the tire diametrically opposite said stop, means restraining the assembly from displacement diametrically of the wheel, said means including an arm mounted on said bar and having a surface slidably engageable with the inner peripheral surface of the rim, and means for applying a force to the pressure assembly axially of the wheel and tire.

3. In a tire changing device, a tension assembly including a tension tube, power means for moving said tube axially thereof, an inwardly extending flange in said tube, a rod telescopically mounted in said tube and extending out therefrom and having an enlargement at one end thereof for engagement with said flange, a tapered inner surface at substantially the top of the tube and above said flange whereby the rod may rock relative to the tube when in extended position, and means resiliently supporting said tube and rod in coaxial alignment.

4. In a tire changing device, a tension assembly including a tension tube, power means for moving said tube axially thereof, an inwardly extending flange in said tube, a rod telescopically mounted in said tube and extending out therefrom and having an enlargement at one end thereof for engagement with said flange, a tapered inner surface at substantially the top of the tube and above said flange whereby the rod may rock relative to the tube when in extended position, means resiliently holding said tube and rod in coaxial alignment, and additional means for releasably supporting said rod in extended position with the enlargement proximate said flange.

5. In a tire changing device, a support for a wheel having a tire to be removed therefrom, a pressure assembly including a bar adapted to extend transversely of the wheel, a stop on said bar to engage the rim at one side thereof, a pressure foot on said bar engageable with the tire opposite said stop, means restraining the assembly from displacement diametrically of the wheel, said means including an arm mounted on said bar and having a surface slidably engageable with the inner peripheral surface of the rim, a tension assembly including a tension tube, power means for moving said tube axially thereof, an inwardly extending flange in said tube, a rod telescopically mounted in said tube and extending out therefrom and having an enlargement at one end thereof for engagement with said flange, a tapered inner surface at substantially the top of the tube and above said flange whereby the rod may rock relative to the tube when in extended position, means resiliently holding said tube and rod in coaxial alignment, and additional means for releasably holding said rod in extended position with the enlargement proximate said flange.

6. A tire changing device comprising a support for a wheel having a tire to be removed therefrom, a pressure applying assembly including a pull down member substantially axial of the wheel, a cross bar adapted to be disposed diametrically of the wheel to be pulled by said member, and vertical stop means carried by said bar to engage the rim at one side to stop the pull down of one end of said bar, a pressure foot carried by the other end of said bar to engage and push down the tire, and transverse stop means including a portion independent of said pressure foot to engage said rim to prevent lateral movement of said bar due to side thrust of said pressure foot.

WILLIAM R. KING.

REFERENCES CITED

The following references are of record in the file of this patent:

UNITED STATES PATENTS

| Number | Name | Date |
|---|---|---|
| 656,057 | Stephens | Aug. 14, 1900 |
| 1,437,085 | Banta | Nov. 28, 1922 |
| 1,475,519 | Snider | Nov. 27, 1923 |
| 1,519,558 | Snider | Dec. 16, 1924 |
| 1,890,746 | O'Dell | Dec. 13, 1932 |
| 1,948,434 | Stafford et al. | Feb. 20, 1934 |
| 2,000,036 | Renfro | May 7, 1935 |
| 2,043,169 | Hawkinson | June 3, 1936 |
| 2,065,644 | Bristol | Dec. 29, 1936 |
| 2,241,056 | Chitton | May 6, 1941 |
| 2,319,155 | Passanante et al. | May 11, 1943 |
| 2,361,206 | Hoppe | Oct. 24, 1944 |
| 2,362,061 | Ewing | Nov. 7, 1944 |
| 2,373,975 | Plumeau et al. | Apr. 17, 1945 |

FOREIGN PATENTS

| Number | Country | Date |
|---|---|---|
| 623,147 | France | Mar. 14, 1927 |